United States Patent
Collet et al.

(10) Patent No.: US 9,311,558 B2
(45) Date of Patent: Apr. 12, 2016

(54) PATTERN RECOGNITION SYSTEM

(71) Applicants: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(72) Inventors: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(73) Assignee: I.R.I.S., Mont-Saint-Guibert (BE)

( * ) Notice: Subject to any disclaimer, the term of this patent is extended or adjusted under 35 U.S.C. 154(b) by 79 days.

(21) Appl. No.: 14/254,076

(22) Filed: Apr. 16, 2014

(65) Prior Publication Data
US 2015/0302268 A1    Oct. 22, 2015

(51) Int. Cl.
G06K 9/62    (2006.01)
G06K 9/46    (2006.01)
G06T 5/10    (2006.01)

(52) U.S. Cl.
CPC ............ G06K 9/4604 (2013.01); G06K 9/4619 (2013.01); G06K 9/6249 (2013.01); G06K 9/6267 (2013.01); G06T 5/10 (2013.01); G06K 2209/01 (2013.01)

(58) Field of Classification Search
None
See application file for complete search history.

(56) References Cited

U.S. PATENT DOCUMENTS

| | | | | |
|---|---|---|---|---|
| 4,544,230 A * | 10/1985 | Caulfield | ............... | G06E 3/005 359/240 |
| 5,206,822 A * | 4/1993 | Taylor | ..................... | G06F 17/16 708/607 |
| 7,174,044 B2 * | 2/2007 | Ding | .................... | G06K 9/4609 382/210 |
| 2005/0025337 A1 * | 2/2005 | Lu | ......................... | G06T 1/0028 382/100 |
| 2010/0223258 A1 * | 9/2010 | Ghahramani | ..... | G06F 17/30247 707/723 |
| 2011/0078226 A1 * | 3/2011 | Baskaran | ............... | G06F 17/16 708/607 |

OTHER PUBLICATIONS

Optimization os sparse matrix-vector multiplication on emerging multicore platforms, Williams et al., ACM 978-1-59593-764-3, 2007, pp. 1-12.*
Optimization of sparse matrix-vector multiplication on emerging multicore platforms, Williams et al., ACM 978-1-59593-764-3, 2007, pp. 1-12.*

* cited by examiner

*Primary Examiner* — Jayesh A Patel
(74) *Attorney, Agent, or Firm* — Jerold I. Schneider; Schneider Rothman Intellectual Property Law Group, PLLC

(57) ABSTRACT

A method for identifying a pattern in an image. In a first step the image is normalized to a binary matrix. A binary vector is subsequently generated from the binary matrix. The binary vector is filtered with a sparse matrix to a feature vector using a matrix vector multiplication wherein the matrix vector multiplication determines the values of the feature vector by applying program steps which are the result of transforming the sparse matrix in program steps including conditions on the values of the binary vector. Lastly, from the feature vector, a density of probability for a predetermined list of models is generated to identify the pattern in the image.

4 Claims, 6 Drawing Sheets

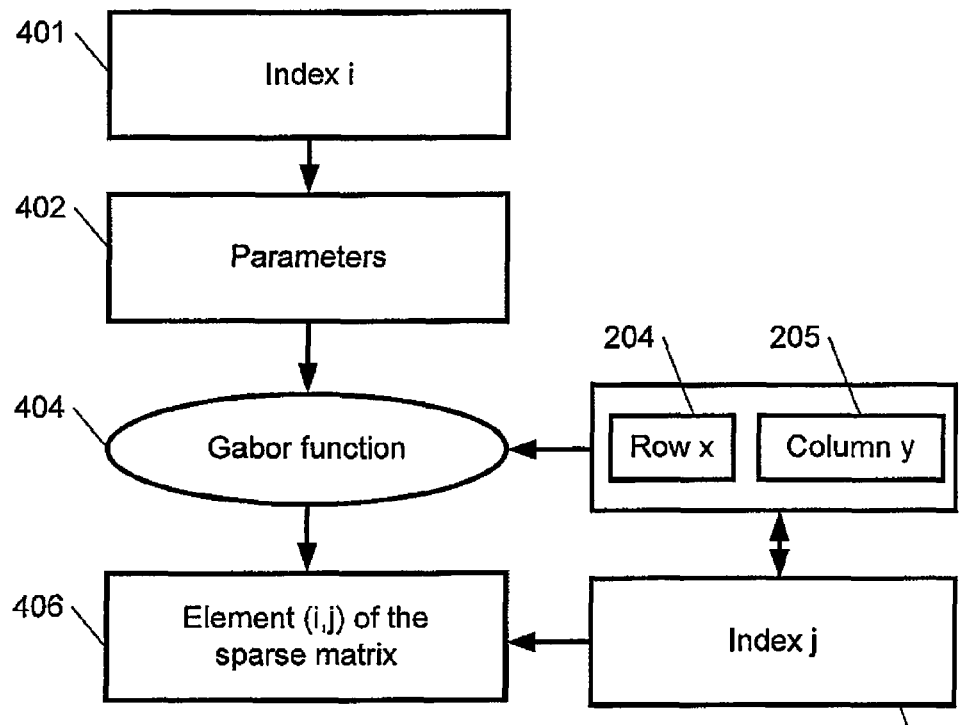
Fig. 4
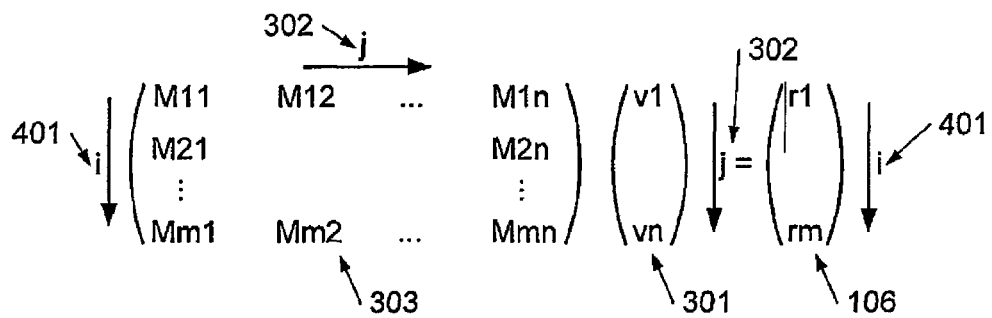
Fig. 5a
Fig. 5b

PATTERN RECOGNITION SYSTEM

FIELD OF THE INVENTION

The invention relates to pattern recognition system. More specifically, the invention relates to a pattern recognition system comprising a matrix multiplication step.

BACKGROUND OF THE INVENTION

A pattern recognition system can be an Optical Character Recognition (OCR). OCR systems are known. They convert the image of text into machine-readable code by using a character recognition process. In an OCR system, the images of what could be characters are isolated and a character recognition process is used to identify the character.

Known optical character recognition processes generally comprise:
- a normalization step that generates a normalized matrix from an input image;
- a feature extraction step; and
- a classification step to identify the character.

In some OCR processes, the feature extraction step involves a matrix vector multiplication between a matrix representing a filter and a vector representing the input image.

Several methods are known for matrix vector multiplications. However, known methods are slow because of the numerous number of calculation steps required.

WO2007/095516 A3 is directed to the problem of accelerating sparse matrix computation. A system and a method are disclosed to decrease the memory traffic required by operations involving a sparse matrix, like a matrix vector multiplication, because the memory bandwidth is a bottleneck in such operations and these system and method concern the storage of, and the access to, a sparse matrix on the memory of a microprocessor.

Another known method of determining a matrix multiplication route for an at least approximate multiplication by a coefficient matrix F is disclosed in WO2004/042601 A2. This method writes the coefficient matrix F as the product of a quantised coefficient matrix G and a correction factor matrix H.

SUMMARY OF THE INVENTION

It is an aim of this invention to provide a method for identifying a pattern in an image that can be calculated fast.

These aims are achieved according to the invention as described in the independent claims.

In an embodiment of the present invention, the method for identifying a pattern in an image, comprising the steps of
- normalizing the image to a binary matrix,
- generating a binary vector from the binary matrix,
- filtering the binary vector with a sparse matrix using a matrix vector multiplication to a feature vector,
- creating with the feature vector a density of probability for a predetermined list of models,
- selecting the model with the highest density of probability as the best model, and
- classifying the best model as the pattern of the input image, wherein the matrix vector multiplication determines the values of the feature vector by applying program steps which are the result of transforming the sparse matrix in program steps including conditions on the values of the binary vector.

The transformation of the sparse matrix in program steps including conditions on the values of the binary vector makes it possible to reduce the number of program steps to a minimum, which increases the speed of execution of the program.

In an embodiment according to the invention, the conditions on the values of the binary vector are verifying if the values of the elements of the binary vector are non-zero.

This has the advantage that, if an element of the binary vector is zero, the steps corresponding to it are not executed by the program, which increases the speed of execution of the program.

In an embodiment of the invention, the transforming of the sparse matrix in program steps further includes conditions on the values of the elements of the sparse matrix. In an embodiment, the conditions on the values of the elements of the sparse matrix are verifying if the values of the elements of the sparse matrix are higher than a predetermined value.

The latter two embodiments have the advantage to limit the amount program steps and thus to increase the speed.

In an embodiment according to the invention, the image is an image of Asian character.

Identification of Asian character may be especially slow due to the high number of different characters. The present invention, which increases the speed of execution of the program for character identification, is therefore especially advantageous for identifying Asian characters.

In an embodiment of the invention, the binary matrix is a 64×64 matrix.

This matrix size has been found to give an advantageous trade-off between high identification accuracy and high computation speed.

In an embodiment according to the invention, the sparse matrix is the result of a filtering based on a Gabor function.

In another embodiment of the invention, the method for identifying a pattern in an image comprises the steps of
- normalizing the image to a binary matrix,
- generating a binary vector from the binary matrix,
- filtering the binary vector with a sparse matrix using a matrix vector multiplication to become a feature vector,
- creating with the feature vector a density of probability for a predetermined list of models,
- selecting the model with the highest density of probability as the best model, and
- classifying the best model as the pattern of the input image, wherein the matrix vector multiplication is an approximate matrix vector multiplication including only the elements of the binary vector which are not zero and including only the elements of the sparse matrix which are higher than a predetermined value.

The fact that only the elements of the sparse matrix higher than a predetermine value and only the elements of the binary vector which are not zero are included in the program makes possible to reduce the number of program steps to a minimum, which increases the speed of execution of the program.

BRIEF DESCRIPTION OF THE DRAWINGS

For a better understanding of the present invention, reference will now be made, by way of example, to the accompanying drawings in which:

FIG. 4 shows a flowchart that describes how the sparse matrix elements are generated in an optical character recognition process according to the invention.

FIG. 5a shows an illustration of matrix multiplication between a sparse matrix and a binary vector used in an optical character recognition process according to the invention.

FIG. 5b shows an illustration of a threshold matrix used in an optical character recognition process according to the invention.

DESCRIPTION OF THE INVENTION

Figure 1:
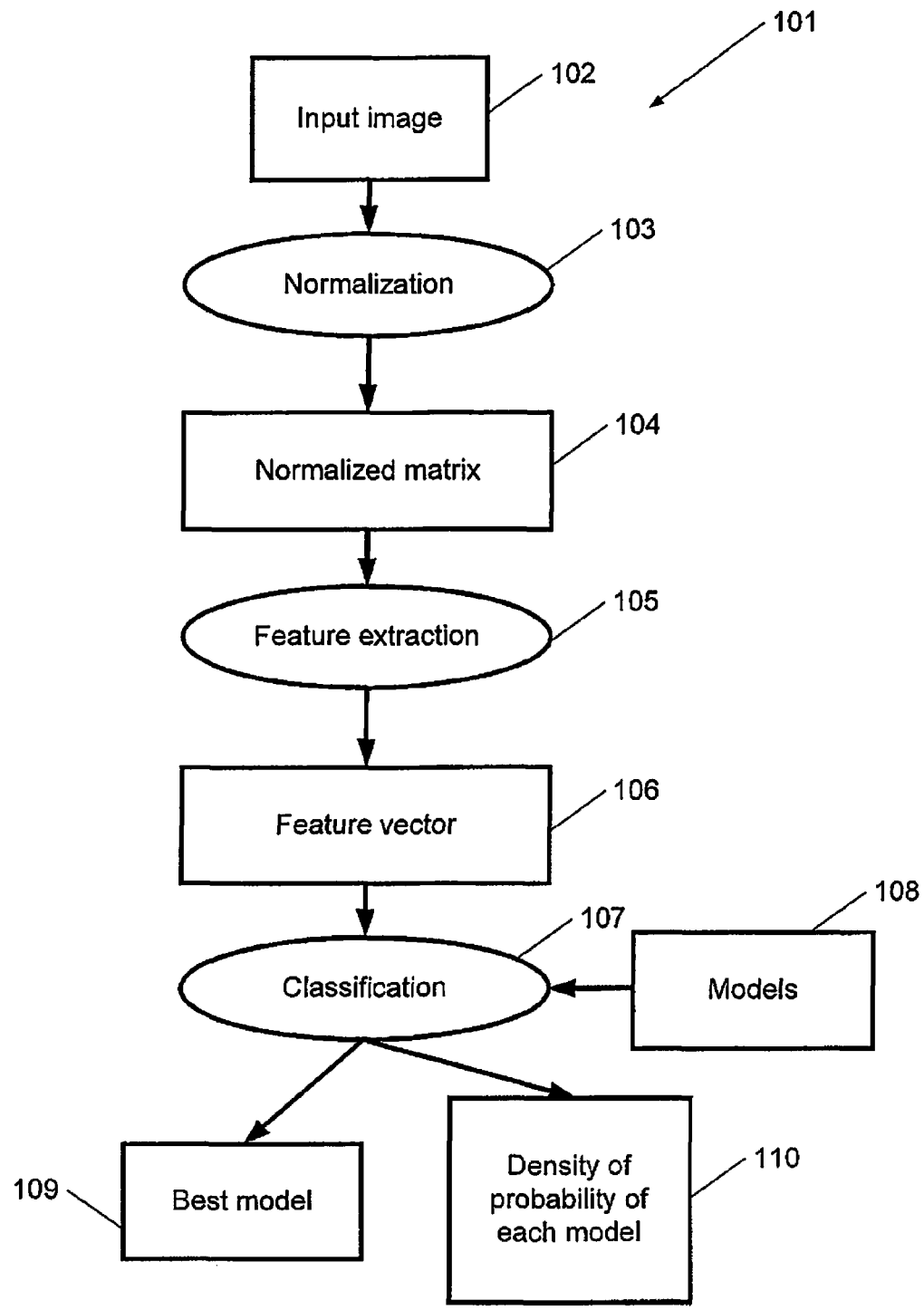
FIG. 1 shows a flowchart of an optical character recognition process according to the invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

Binary numbers, vectors and matrices are assumed here to be written with 0 and 1 but it is clear for somebody skilled in the art that it could be written as true and false, black and white or any other means to state a binary state.

In an embodiment of the present invention, binary images are processed. Binary images are digital images with only two possible colours for each pixel. These two colours, usually black and white, can be represented as true and false values or 1 and 0 values. A representation with 1 and 0 is especially useful to perform mathematical image processing. The processing of binary images often involves filtering steps in order for example to enhance some characteristics of the image, or to perform some morphological operations on the image. Filters are usually mathematically described by matrices and the application of a filter on a binary image is described by the matrix multiplication of the filter matrix and the binary image matrix. This kind of operation can for example be used in Optical Character Recognition, as a step in the image treatment to extract the image features in view of recognizing an optical character.

Optical Character Recognition systems convert the image of text into machine-readable code by using a character recognition process. In an OCR system, the images of what could be characters are isolated and a character recognition process is used to identify the character.

An embodiment of the present invention relates to optical character recognition starting from an input image representing a character. A further embodiment of the present invention relates to optical character recognition starting from an input image representing an Asian character. The input image is, in an embodiment of the invention, a two colours image. In a preferred embodiment of the present invention, the input image is a black and white image. In a further embodiment of the present invention, the input image is a two-dimensional pattern, like a logo, a picture or a design, to be recognized by the recognition system. In a further embodiment of the present invention, the input image is a pattern, like a sequence of sound, a sequence of film or a three-dimensional image, to be recognized by the recognition system.

An optical character recognition process 101 according to an embodiment of the invention shown in FIG. 1, comprises:
  a step of normalization 103 that generates a normalized matrix 104 from an input image 102;
  a step of feature extraction 105 that generates a feature vector 106 from the normalized matrix 104; and
  a step of classification 107 that calculates a best model 109 for the input image 102 amongst a series of possible models 108. The step of classification also returns a density of probability 110 of each model, which provides a measure of the accuracy of the classification step 107.

Figure 2:
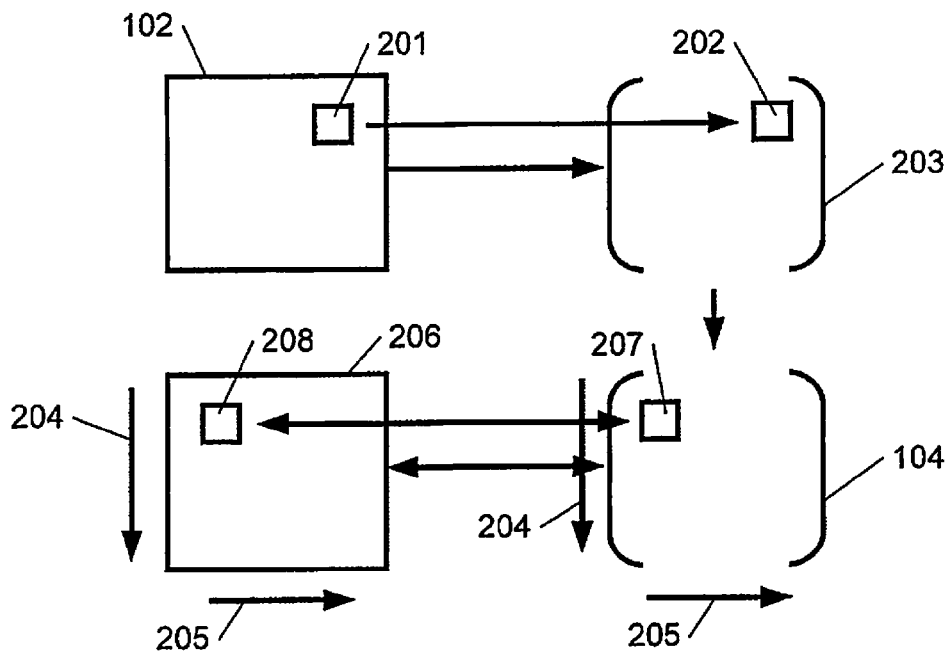
FIG. 2 shows is a schematic illustration of a normalization step in an optical character recognition process according to the invention.

In the normalization step 103, the input image 102 is subdivided into pixels 201. Each pixel 201 of the input image 102 is represented by an element 202 of an intermediate matrix 203, as illustrated in FIG. 2. The intermediate matrix 203 is, in an embodiment of the invention, a binary matrix.

The input image 102 is centered and its size is adjusted to a predetermined format to provide a normalized image 206 represented by a normalized matrix 104. Every element 207 of the normalized matrix 104 corresponds to a pixel 208 on the normalized image 206. In an embodiment of the present invention, the centering of the input image 102 and the adjustment of the input image 102 to a predetermined format is a combination of steps that may include scaling, thresholding, smoothing, interpolation, filtering,. . . .

The normalized matrix 104 is a binary matrix, which corresponds to a two-colours normalized image 206. Every element of the normalized matrix 104 is characterized by its row x 204 and its column y 205, which corresponds to a location on the normalized image 206. In an embodiment of the present invention, the normalized matrix 104 is a 64×64 matrix. In an embodiment of the present invention, in the normalized image 206, the standard deviation of the distance from the centre of the value representing the pixels of a given colour is constant and equal to 16 pixels. In an embodiment of the present invention, the height width aspect ratio of the pattern or character is preserved during the normalization step 103.

Figure 3:
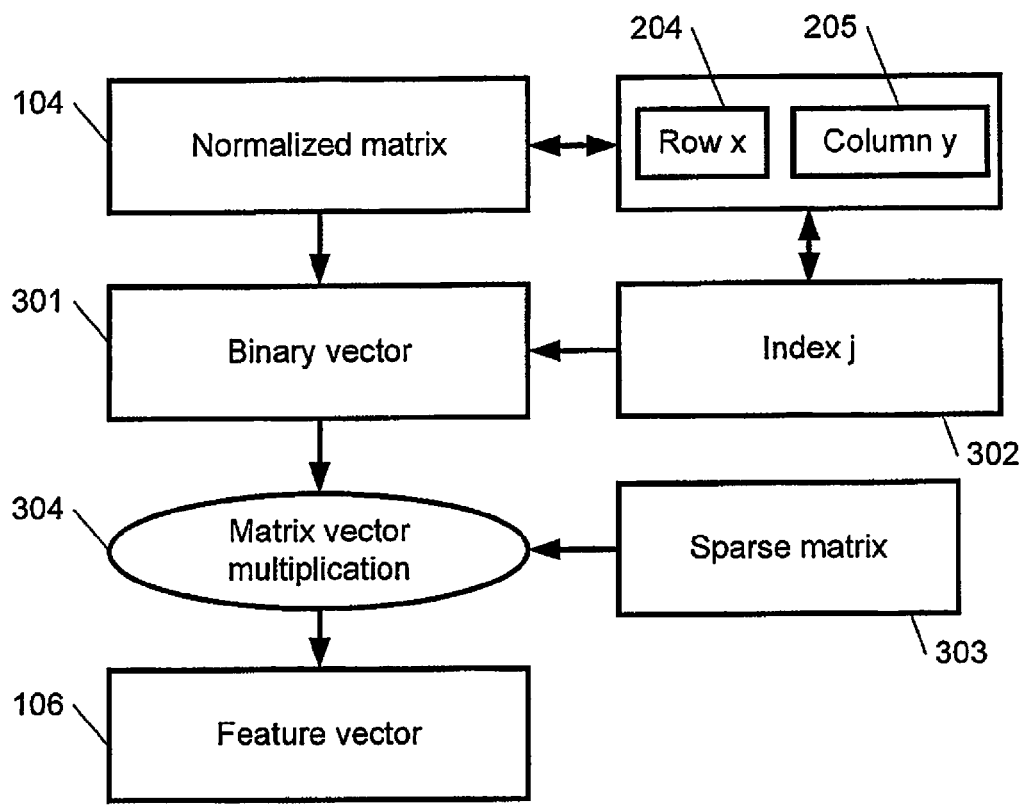
FIG. 3 shows a flowchart of a feature extraction step in an optical character recognition process according to the invention.

The feature extraction step 105 that generates the feature vector 106 from the normalized matrix 104 involves a matrix vector multiplication 304. This can be explained in details with the help of FIG. 3. The normalized matrix 104 of dimensions AxB is transformed into a binary vector 301 of length A*B. During this transformation, each element of the binary vector 301 is set equal to an element of the normalized matrix 104 in such a way that all elements of the normalized matrix 104 are copied only once in the binary vector 301. The binary vector 301 contains the normalized image 206 information. The location of an element of row x 204 and column y 205 in the normalized matrix 104, i.e., that corresponds to a location in the normalized image 206, corresponds also to a specific value of the index j 302 that indicates the $j^{th}$ element of the binary vector 301. In an embodiment of the present invention, the binary vector 301 has 4096 elements and the index j can take all integer values between 1 and 4096. This corresponds to a 64×64 normalized matrix 104 (64*64=4096).

In an embodiment of the present invention, the matrix vector multiplication 304 is approximate and the feature vector 106 is an approximation of the exact mathematical result of the matrix multiplication between a sparse matrix 303 and the binary vector 301. An index i 401 is used to specify the $i^{th}$ element of the feature vector 106. The adjective "sparse" indicates that the matrix is populated primarily with zeros in an embodiment of the present invention.

FIG. 4 describes the generation, with a Gabor function 404, of an element 406 located at row i 401 and column j 302 of the sparse matrix 303. All elements 406 of the sparse matrix 303 are generated in the same way. The Gabor function 404 is a plane sinusoidal wave multiplied by a Gaussian function. The Gabor function 404 has parameters 402, which correspond to the index i, and variables x 204 and y 205, which correspond to the index j, as inputs.

The row index i 401 of the sparse matrix element 406 to calculate, specifies the values taken by the parameters 402 used in the Gabor function 404. In an embodiment of the present invention, the parameters 402 are represented by the symbols $\alpha_i$, $\sigma_i$, $\lambda_i$, $Cx_i$ and $Cy_i$:

$\alpha_i$ is an angle related to the direction of the plane sinusoidal wave of the Gabor function 404;

$\sigma_i$ is the standard deviation of the Gaussian function of the Gabor function 404;

$\lambda_i$ is the wavelength of the plane sinusoidal wave of the Gabor function 404;

$Cx_i$ is the centre of the Gabor function 404 on the normalized image 206, in the vertical direction; and $Cy_i$ is the centre of the Gabor function 404 on the normalized image 206, in the horizontal direction.

The column index j 302 of the sparse matrix element 406 to calculate, specifies the values of the variables x 204 and y 205 used by the Gabor function 404.

The Gabor function 404 is expressed by:

$$g[i, (x, y)] = \frac{1}{2\pi\sigma_i^2}\exp\left\{i\frac{2\pi}{\lambda_i}[\cos(\alpha_i)(x - Cx_i) + \sin(\alpha_i)(y - Cy_i)] - \frac{(x - Cx_i)^2 + (y - Cy_i)^2}{2\sigma_i^2}\right\}$$

The output of the Gabor function 404 calculated
from a given set of parameters 402 of index i 401,
at a given position of row x 204 and column y 205 of the normalized image 206 that corresponds to the index j 302
is the element 406 of row i 401 and column j 302 in the sparse matrix 303. The number of columns of the sparse matrix 303 is equal to the number of elements of the binary vector 301. In an embodiment of the present invention, the sparse matrix 303 is a 300×4096 matrix.

A matrix vector multiplication 304 is performed to multiply the sparse matrix 303 and the binary vector 301, the sparse matrix 303 being the first factor of the multiplication and the binary vector 301 being the second factor of the multiplication as illustrated in FIG. 5. The vector resulting of the multiplication of the sparse matrix 303 and the binary vector 301 is the feature vector 106. The number of elements of the feature vector 106 is equal to the number of rows of the sparse matrix 303. In an embodiment of the present invention, the number of elements of the feature vector 106 is equal to 300. In an embodiment of the present invention, the feature vector 106 contains specific information about the input image 102, this specific information being related to the image features important in view of pattern recognition.

The matrix multiplication between the sparse matrix 303 and the binary vector 301 resulting in the feature vector 106 is shown on FIG. 5a. The elements of the sparse matrix 303 are called Mij. i is the index that gives the row number and takes all integer values between 1 and m. j is the index that gives the column number and takes all integer values between 1 and n. The binary vector 301 has one column of n elements called vj. The feature vector 106 has one column of m elements called ri. The matrix multiplication is such that the feature vector 106 elements ri are calculated as $$ri = \sum_{j=1}^{n} Mij\, vj \qquad \text{(Equation 1)}$$

Some terms may be neglected in the sum of Equation 1. For example, the terms Mij vj where vj is equal to zero are also equal to 0. Further, in the case where vj is equal to 1, and where the sparse matrix 303 element Mij is small, the term Mij vj may also be neglected. To control "small", a threshold matrix 501 with elements Tij, shown on FIG. 5b, is used. In an embodiment of the present invention, a term Mij vj can be neglected if Mij is lower than Tij. In a further embodiment of the present invention, all the elements Tij of the threshold matrix 501 have the same value. Since the Gabor function 404 is a plane sinusoidal wave multiplied by a Gaussian function, many of the elements of the sparse matrix 303 are very small.

Figure 6:
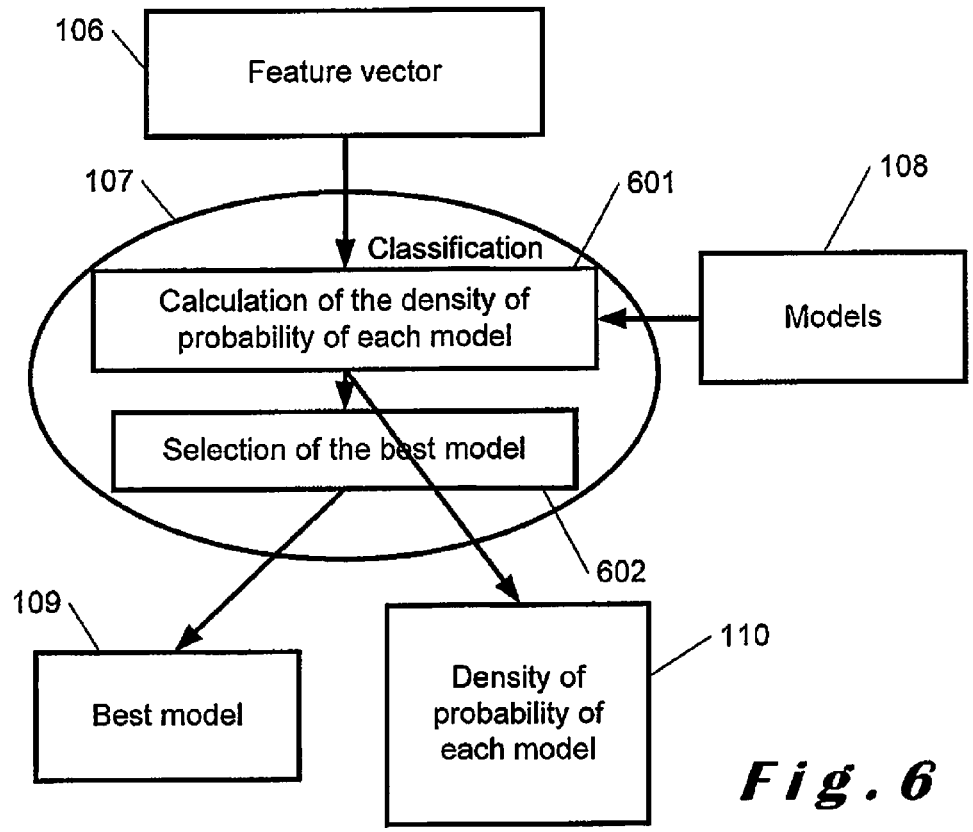
FIG. 6 shows a flowchart of a classification step in an optical character recognition process according to the invention.

The classification step 107 of the OCR process 101 can be described with the help of FIG. 6. In an embodiment of the present invention, the classification step 107 is a variation of the nearest neighbour classifier method that uses weighted Euclidian distance where weights are different for each class. The classification step 107 uses the feature vector 106 and models 108 as inputs. In an embodiment of the present invention, the models 108 correspond to characters, groups of characters or characters in a given font family. In a preferred embodiment of the present invention, the models 108 correspond to Asian characters, groups of Asian characters or Asian characters in a given font family. In an embodiment of the present invention, the models 108 correspond sequences of sound, sequences of film or a three-dimensional patterns.

In an embodiment of the present invention, a model 108 is defined by a covariance matrix Σ and an average vector μ. In an embodiment of the present invention, all the non-diagonal elements of Σ are set to zero. In an embodiment of the present invention, the covariance matrices Σ are multiplied by a constant (different constant for each model) in such a way that the traces of the covariance matrices Σ of all the models are equal. In an embodiment of the present invention, the covariance matrix is approximated. In an embodiment of the present invention, Σ is a 300×300 matrix and p a vector of 300 elements.

To select the model that corresponds best to the input image 102 corresponding to the feature vector 106, for each model 108, a density of probability 110 is calculated as $$p(r) = \frac{1}{\sqrt{(2\pi)^k |\Sigma|}} \exp\left[-\frac{(r-\mu)^t \Sigma (r-\mu)}{2}\right],$$

where the symbol r represents the feature vector 106.

The symbol IEI represents the determinant of the matrix Σ and the t in $(r-\mu)^t$ indicates that the transposition of the vector $(r-\mu)$. k is equal to the number of elements of the feature vector 106. In an embodiment of the present invention, k is equal to 300. The product $(r-\mu)^t\Sigma(r-\mu)$ is a matrix multiplication following the usual mathematical conventions.

Once the density of probability 601 of each model 108 is calculated in a calculation step 601, the best model 109 is selected in a selection step 602. The best model 109 is the model with the highest density of probability 110. In an embodiment of the present invention, the classification step 107 returns the best model 109 and the density of probability 110 of each model, to provide a measure of the accuracy of the classification step. In an alternative embodiment, the classification step 107 returns only the best model 109. In an alternative embodiment, the classification step 107 returns only the density of probability of each model 110.

Figure 7:
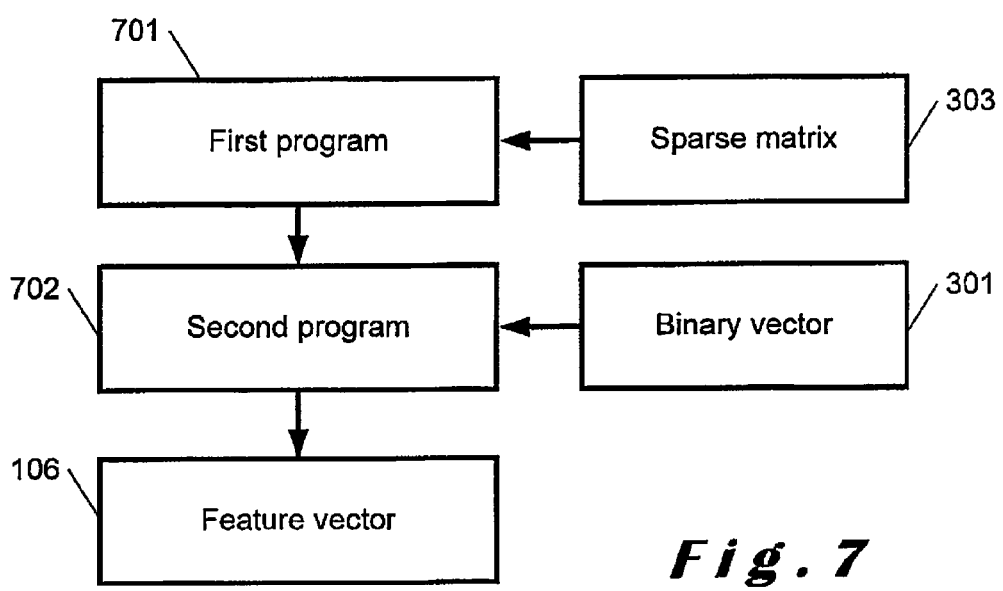
FIG. 7 shows a flowchart of an embodiment of the first and the second programs in an optical character recognition process according to the invention.

FIG. 7 illustrates a matrix vector multiplication process 304 according an embodiment of the present invention. The sparse matrix 303 is used as an input in a first program 701. When using the sparse matrix 303 as an input, the first program 701 generates a second program 702. Details of the first program 701 and the second program 702 are discussed below. The binary vector 301 is used as input in the second program 702. When using the binary vector 301 as an input, the second program 702 calculates a feature vector 106 being the result of the matrix vector multiplication 304 between the sparse matrix 303 and the binary vector 301.

Figure 8:
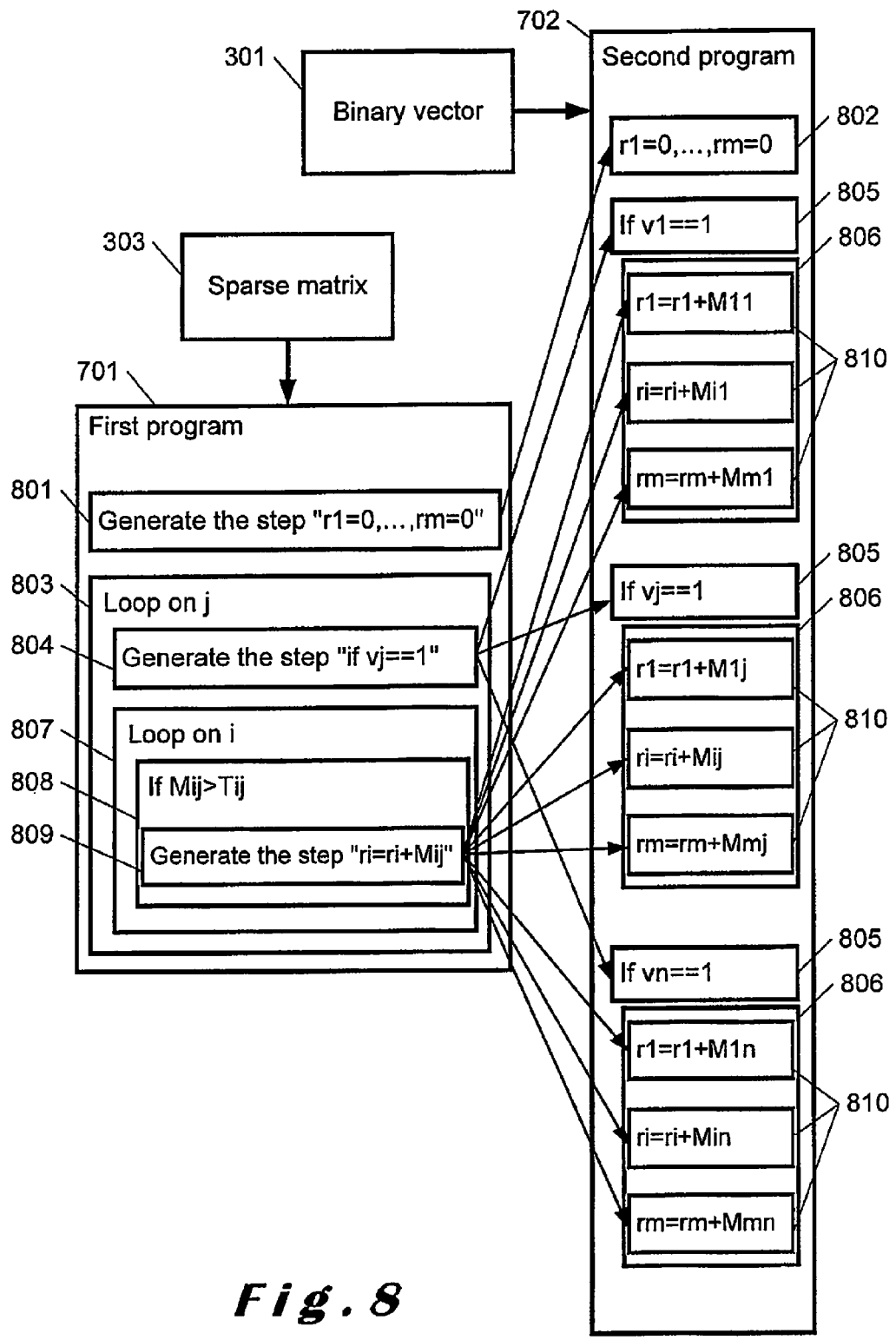
FIG. 8 illustrates the generation of the steps of the second program by the first program.

The first program 701 and the second program 702 are illustrated in FIG. 8. The first program 701 generates the steps of the second program 702 using the values of the elements of the sparse matrix 303 as input. The values of the elements of the binary vector 301 are unknown when the first program 701 generates the second program 702, they are therefore considered as parameters that can take the values 0 and 1.

The first program 701 includes a step 801 that generates a initialization step 802 in the second program 702. In an embodiment of the present invention the initialization step 802 set values of the elements of the feature vector 106 to zero.

The first program 701 includes a loop 803 on the index j that corresponds to the elements vj of the binary vector 301. The index j can take integer values between 1 and n.

The loop 803 in the first program 701 includes a step 804 in the first program 701 that generates conditional steps 805 in the second program 702. Each conditional step 805 corresponds to a value of the index j of the loop 603. Each conditional step 805 gives a condition on the value of the $j^{th}$ element vj of the binary vector 301. Each conditional step 805 indicates in the second program 702 that a set of steps 806 have to be executed in the second program 702 only if the value vj of the $j^{th}$ element of the binary vector 301 is equal to 1. Since the elements of the binary vector 301 can only take the values 1 and 0, the set of steps 806 will not be executed in the second program 702 if the value vj is equal to 0.

The loop 803 in the first program 701 includes a loop 807 on the index i that corresponds to the elements ri of the feature vector 106. The index i can take integer values between 1 and m.

The loop 807 in the first program 701 includes a conditional step 808 in the first program 701. Each conditional step 808 corresponds to a value j of the index of the loop 803 and a value i of the index of the loop 807. Each conditional step 808 gives a condition on the values of the element Mij of the sparse matrix 303 and the element Tij of the threshold matrix 501. Each conditional step 808 indicates in the first program 701 that a step 809 can be executed in the first program 701 if the element Mij of the sparse matrix 303 is higher than the element Tij of the threshold matrix 501.

The step 809 in the first program 701 generates addition steps 810 in the second program 702. The addition step 810 in the second program 702 corresponding to a value j of the index of the loop 803 and a value i of the index of the loop 807 in the first program 701 is generated only if the element Mij of the sparse matrix 303 is higher than the element Tij of the threshold matrix 501. If the element Mij of the sparse matrix 303 is not higher than the element Tij of the threshold matrix 501, the addition step 810 does not appear in the second program 702. The addition step 810 in the second program 702 corresponding to indexes i and j equals ri to ri plus Mij.

The second program 702 generated by the first program 701 as explained here performs an approximated matrix multiplication 304 of the sparse matrix 303 and the binary vector 301. In an alternative embodiment of the present invention, the threshold matrix 501 is equal to zero and the matrix multiplication 304 is exact, not approximated.

The order in which the elements vj of the binary vector 301 are considered is not important. The second program 702 could start with any element vj and consider the elements vj one by one in any order, as long as all elements are eventually considered and all elements are considered only once. In other words, the loop 803 in the first program 701 could consider the values of the index j in any order.

Further, the order in which the elements Mij of a given row j of the sparse matrix 303 are considered inside a set of steps 806 that depend on vj is not important. The second program 702 could start with any element Mij and consider the elements one by one in any order (j being fixed, i being varied inside the set of steps 806), as long as all values of i are eventually considered and all values of i are considered only once. In other words, the loop 807 in the first program 701 could consider the values of the index i in any order.

The second program 702 as generated by the first program 701 has several advantages that makes it especially fast. The advantages are the following:

Only the elements Mij of the sparse matrix 303 higher than the threshold Tij are present in the second program 702. The conditions "Mij higher than Tij" 808 are checked only in the first program 701 and the elements Mij lower than or equal to Tij do not generate steps in the second program 702. This absence is mathematically justified by the fact that for Mij very small, Mij vj is also very small (vj is equal to 0 or 1) and this term can be ignored in the sum of Equation (1). This first advantage minimizes the number of steps present in the second program 702. This first advantage is especially interesting with the number of elements equal to 0 in the sparse matrix 303 is high.

If an element vj of the binary vector 301 is equal to 0, the set of steps 806 that depend on vj is skipped during the execution of the second program 702, which saves execution time. It is therefore important that all statements corresponding to a given element vj of the binary vector 301 be grouped together in a set of steps 806. This second advantage minimizes the number of steps executed by the second program 702. This second advantage is especially interesting with the number of elements equal to 0 in the binary vector 301 is high.

In a conventional matrix multiplication, the matrix elements are stored remotely from the program that performs the matrix multiplication and the program calls every element in turn, which takes time. In the present invention, the sparse matrix 303 elements are stored in the second program 702 itself.

The second program 702 explicitly considers all elements vj of the binary vector 301 and all elements ri of the resulting feature vector 106. This process is sometimes referred to as "loop unrolling". The second program 702 goes however much further than simple "loop unrolling" since
- the two possible values of the binary vector 301 elements are replaced by conditional steps 805,
- the number of conditional steps 805 is equal to the number of elements of the binary vector because each vj is considered only once in a conditional step 805,
- only the elements of the sparse matrix 303 strictly higher than a threshold given by a threshold matrix 501 generate an addition step 810 in the second program 702, If the elements of the threshold matrix 501 are different than zero, the generation of the second program 702 by the first program 701 introduces an approximation in the matrix vector multiplication 304.

Figure 9:
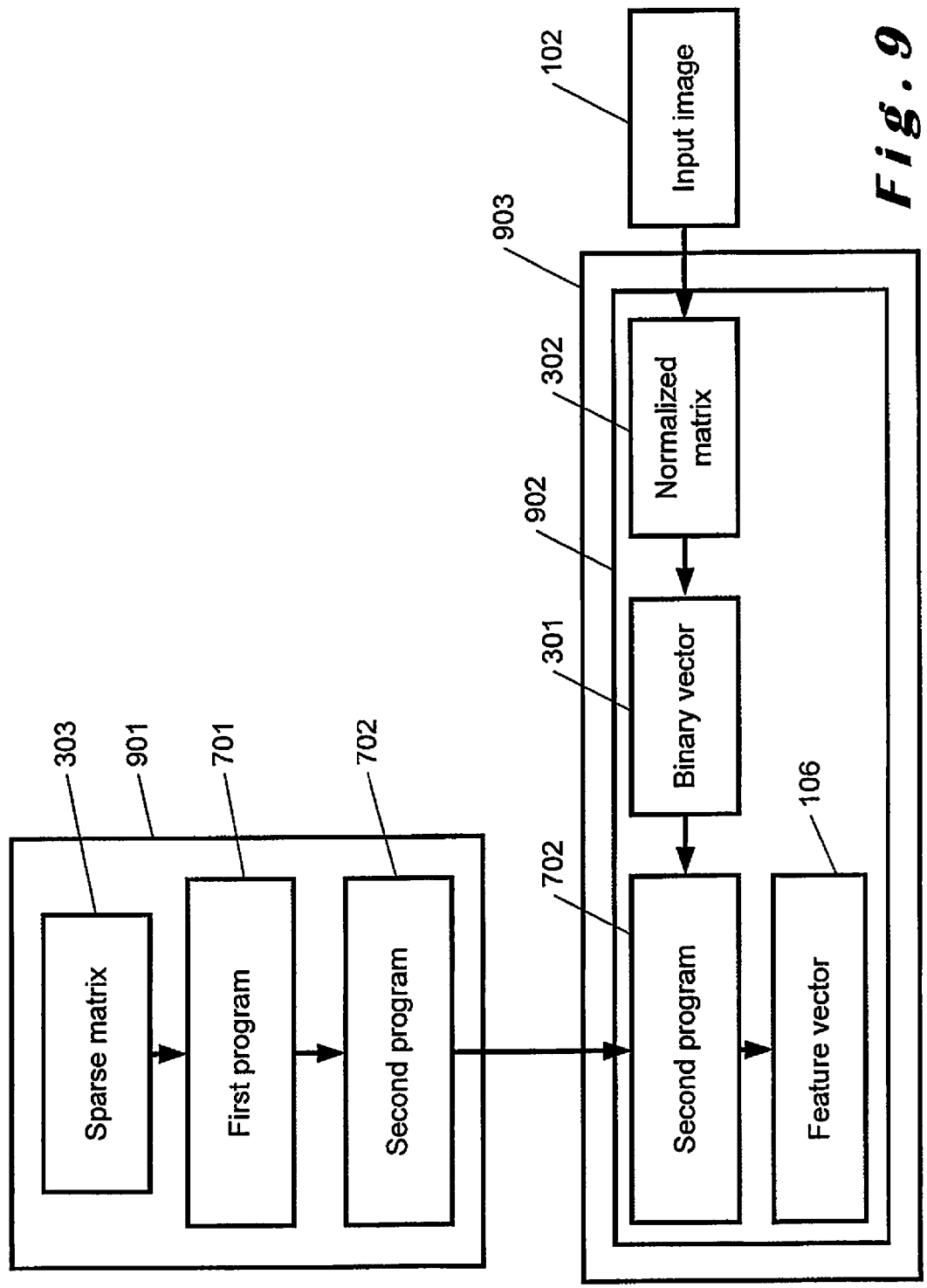
FIG. 9 shows a flowchart of an embodiment of the first and the second programs in an optical character recognition process according to the invention.

In an embodiment of the present invention, the OCR system is used in a mobile terminal as shown in FIG. 9. The first program 701 can run on a computing device 901 requiring important computing resources. In an embodiment of the present invention, the computing device may be a personal computer. The first program 701 uses the sparse matrix 303 as an input and generates the second program 702 as output. The second program 702 is subsequently used on the CPU 902 of the mobile OCR terminal 903, which has typically less computing resources than a personal computer. The input image 102 follows the normalization step 103 in CPU 902 of the mobile OCR terminal 903 to generate the normalized matrix 104 representing the input image 102. The normalized matrix 104 is then transformed into the binary vector 301 as described above. The second program 702 calculates the feature vector 106 being the result of the matrix vector multiplication 304 between the sparse matrix 303 and the binary vector 301. Since the second program 702 as described by the present invention is especially fast, the matrix vector multiplication 304 can be performed very fast by a CPU, which is a major advantage over standard matrix vector multiplication processes.

The invention claimed is:

1. A method for identifying a pattern in an image, comprising the steps of
   normalizing the image to a binary matrix,
   generating a binary vector from the binary matrix,
   filtering the binary vector with a sparse matrix using a matrix vector multiplication to become a feature vector,
   creating with the feature vector a density of probability for a predetermined list of models,
   selecting a model with the highest density of probability as the best model, and
   classifying the best model as the pattern of the input image,
   wherein the matrix vector multiplication is an approximate matrix vector multiplication including only the elements of the binary vector which are not zero and including only the elements of the sparse matrix which are higher than a predetermined value.

2. The method according to claim 1, wherein the image is an image of an Asian character.

3. The method according to claim 2, wherein the binary matrix is a 64×64 matrix.

4. The method according to claim 3, wherein the sparse matrix is the result of a filtering based on a Gabor function.

* * * * *